United States Patent [19]

Lawson

[11] Patent Number: 4,671,059
[45] Date of Patent: Jun. 9, 1987

[54] DIESEL PARTICULATE TRAPS

[75] Inventor: Alexander Lawson, Burlington, Canada

[73] Assignee: Ontario Research Foundation, Mississauga, Canada

[21] Appl. No.: 880,053

[22] Filed: Jun. 30, 1986

[51] Int. Cl.⁴ .............................................. F01N 3/02
[52] U.S. Cl. ........................................ 60/309; 60/311; 60/323
[58] Field of Search .................. 60/311, 323, 299, 321, 60/282, 298, 309

[56] References Cited

U.S. PATENT DOCUMENTS

| | | | |
|---|---|---|---|
| 2,021,690 | 11/1935 | Kaufman | 60/309 |
| 4,211,075 | 7/1980 | Ludecke | 60/311 |
| 4,319,453 | 3/1982 | Mann | 60/311 |
| 4,625,511 | 12/1986 | Scheitlin | 60/299 |

*Primary Examiner*—Douglas Hart
*Attorney, Agent, or Firm*—Sim & McBurney

[57] ABSTRACT

A particulate trap system for use with a diesel engine includes a first particulate trap in heat exchange relation with the exhaust materials passing through the first exhaust bank, and a second particulate trap similarly located with respect to the second exhaust bank. A first exhaust pipe extends from the first exhaust bank to the inlet of the second trap, while a second exhaust pipe extends from the second exhaust bank to the inlet of the first trap. Each exhaust pipe is sufficiently long to allow some condensation of hydrocarbons in the exhaust materials due to cooling thereof. When the mixture of exhaust gases and condensed hydrocarbons arrives in the respective traps, the temperature is again increased due to the heat exchange taking place, and trap regeneration through combustion takes place.

2 Claims, 8 Drawing Figures

… …

DIESEL PARTICULATE TRAPS

This invention relates generally to diesel particulate traps.

BACKGROUND OF THIS INVENTION

Diesel engine exhaust traps are currently being manufactured by Corning and others. The trap is of ceramic, and is placed in line in series with the exhaust pipe, so that all exhaust gases must go through the trap. The trap is constructed in such a way that the gases must literally pass through a ceramic wall with a very small pore size, in order to escape to the atmosphere. If the pores are too small, or become clogged, then a back pressure arises upstream of the trap, which can be sensed.

Diesel engines can operate under full load or under some fraction of full load. An engine operating at or close to full load will normally develop quite high exhaust temperatures, in the region of 500° C. The exhaust gases contain unburned carbon and normally also contain unburned organics (hydrocarbons for example), which typically are in the vapourized state at that temperature.

The ceramic trap captures the carbon, because the carbon particles are too large to pass through the small pores of the walls. What is intended is that the carbon be ignited within the trap and burned to CO or $CO_2$, thus disappearing from the trap with the resultant gases passing through the walls of the trap.

If a diesel engine is operating at a fraction of the full load, it will not develop high exhaust temperatures. The exhaust temperatures may be only around 200° C., and this low temperature is generally insufficient to ignite the carbon within the trap. Conventionally, one approach to this problem is to lower the ignition temperature of the carbon in the trap, and one way of doing this is to coat the inside of the wall with a catalyst, for example a precious metal such as platinum or palladium. Another approach is to put a metal additive into the fuel, which may be organic manganese or copper manganese. The result is that the carbon particles intimately contain the manganese. Copper and manganese are low-activity catalysts.

The disadvantage of using a precious metal catalyst is that, because these metals are so active, they can also oxidize $SO_2$ to $H_2SO_4$.

A different approach is to coat the ceramic trap itself with a base metal catalyst such as manganese or copper. This requires a higher temperature to operate properly, but under some conditions is acceptable.

The foregoing is known technology, and the present applicant has been utilizing this technology in work with underground diesel installations, where the diesel engines typically operate at an 80% load factor. Thus, the engine typically runs at least 80% of full rated load, which is a very hot running condition. For this reason, the known technology works satisfactorily due to the high temperatures of the exhaust gases.

However, for trucks and other vehicles, particularly those running on city streets like buses, the diesel engine has a very light load duty cycle (from 20% to 30% typically), and the result is a very low exhaust gas temperature, typically about 200° C., as mentioned earlier.

Currently, and especially in the United States, very stringent standards of particulates in emissions are being legislated. The requirements for 1990 are so rigorous that all such diesel engines will probably require traps.

Even though the catalytic technology described above improves the functioning of the trap at low duty cycles, nonetheless this technology does not function satisfactorily in all instances. Even the location of traps close to the engine in order to make use of maximum exhaust temperatures to burn off the accumulated particulate is of little use when the exhaust temperatures are low as a result of a low duty cycle. If combusting of the trapped particulate does not occur, then the trap will eventually become plugged with accumulated soot, thus interfering with proper operation of the diesel engine due to exhaust back-pressure.

More particularly, it is found that the use of a catalyst can reduce the ignition threshold temperature in the trap by 150° C. to 350° C., with the trap in the normal location in the exhaust system, i.e. close to the engine. An ignition threshold of 350° C., however, still presents problems under some vehicle driving conditions, such as stop and go traffic, where exhaust temperatures are normally insufficient to reach the 350° C. threshold.

GENERAL DESCRIPTION OF THIS INVENTION

Described herein are several alternative solutions to the problems raised above.

One of the solutions provided herein is to locate the trap remote from the engine on the exhaust system, allowing condensed hydrocarbons from the exhaust gas to fill the pores of the trapped particulate matter and provide a fuel to assist the ignition of the particulate. This solution is particularly applicable to a V-configuration engine having two exhaust banks. The trap of one exhaust is located close to the manifold of the other, and vice versa.

A second approach to solving these problems involves providing a blower bypass operation together with the introduction of a supplemental fuel mixture into the exhaust gas stream. The bypass blower is operated to raise the exhaust gas temperatures when the engine is operated at less than full load, and this is followed by the controlled introduction of a finely atomized fuel mixture which utilizes the higher exhaust gas temperatures to ignite more easily.

A third approach to solving the problems of regenerating diesel particulate filters involves introducing a combustible fuel mixture containing a fuel additive combined with air into the exhaust gas stream prior to entering the inlet side of the particulate filter. A control system utilizing back pressure switches is employed to control the system.

In a fourth approach, a bypass blower provides a reduced scavenging ratio and a lower trapped air-fuel ratio, which results in higher cylinder and exhaust gas temperatures. Thus the regeneration of trapped insoluble particulate in the trap comes about by increasing the exhaust gas temperature at medium load conditions.

More particularly, this invention provides a particulate trap system for use with a diesel engine having a first and a second exhaust bank. The trap system incorporates a first particulate trap in heat-exchange relation with the exhaust materials passing through the first exhaust bank, at a location substantially immediately downstream of the first exhaust bank, and a second particulate trap in heat-exchange relation with the exhaust materials passing through the second exhaust bank, at a location substantially immediately downstream of the second exhaust bank. Each trap has an inlet and an outlet. A first exhaust pipe from the first exhaust bank extends to the inlet of the second particulate trap, and a second exhaust pipe from the second exhaust bank extends to the inlet of the first particulate trap. Each exhaust pipe is of sufficient length to allow some condensation of hydrocarbons in the exhaust materials due to cooling thereof. Exhaust conduit means are provided to duct exhaust materials from the outlet of each trap to the atmosphere.

GENERAL DESCRIPTION OF THE DRAWINGS

DETAILED DESCRIPTION OF THIS INVENTION

As stated briefly earlier, the first facet of this invention is based on the discovery that, if the trap is located remote from the engine on the exhaust system, regeneration can be achieved at ignition temperatures as low as 250° C. This is believed to be due to condensed hydrocarbons from the exhaust gas filling the pores of the trapped particulate matter and providing a fuel to assist the ignition of the particulate. Thus, the nature of the particulate trapped at a remote location will burn at a much lower temperature.

Figure 1:
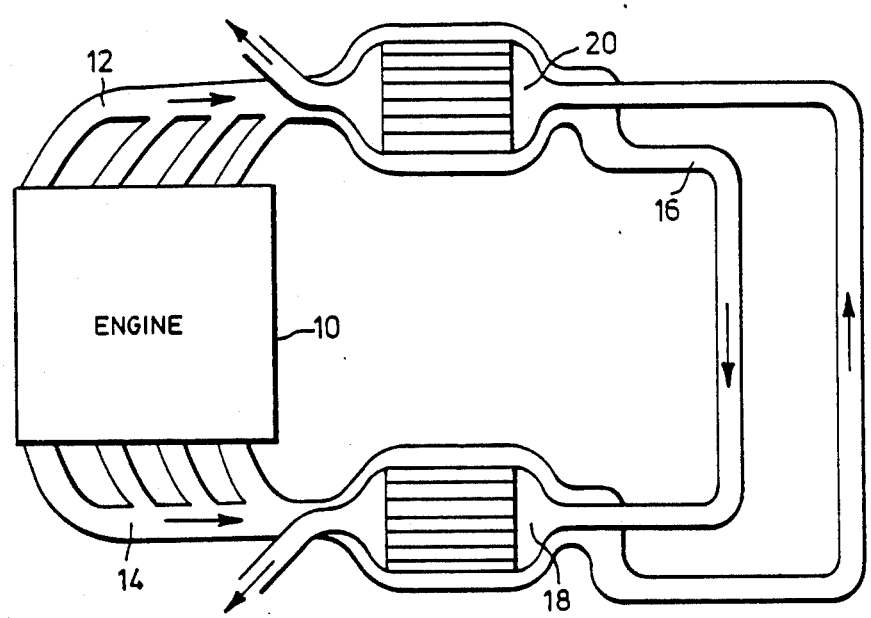
FIG. 1 is a schematic view of an engine exhaust system illustrating the first approach provided herein.

However, exhaust temperatures are also lower in the remote location for any given engine load, compared to the normal location. Therefore, in this facet of the invention, the trap is located close to the engine manifold of a V-configuration engine 10 having two exhaust banks 12 and 14 as shown in FIG. 1. The exhaust from exhaust bank 12 is directed through a length of exhaust conduit 16 at least 6 meters in length to a trap 18, so that the particulate entering the trap 18 is of a character to ignite at 250° C. The trap, however, is located close to the exhaust manifold of exhaust bank 14, so that heat exchange from the exhaust can be applied to the adjacent trap 18, thereby raising its temperature to about 350° C. The particulate entering the trap 18, which contains exhaust directed remotely from exhaust bank 12, will therefore ignite on the trap since its combustion threshold is 250° C., whereas the trap temperature is 350° C. A similar arrangement is made for the exhaust from exhaust bank 14, which is directed along an exhaust conduit 19 to a remote trap 20 located close to exhaust bank 12. It should be noted that the heat exchange system will also serve to cool the exhaust gas before it enters its respective trap, thereby encouraging hydrocarbon condensation reactions and lowering of the particulate combustion threshold. This system is expected to allow continuous regeneration of the traps over most vehicle duty cycles.

While this system is particularly applicable to V-configuration engines with dual exhaust, single exhaust systems could also be accommodated by splitting the exhaust into a dual configuration.

Figure 1B:
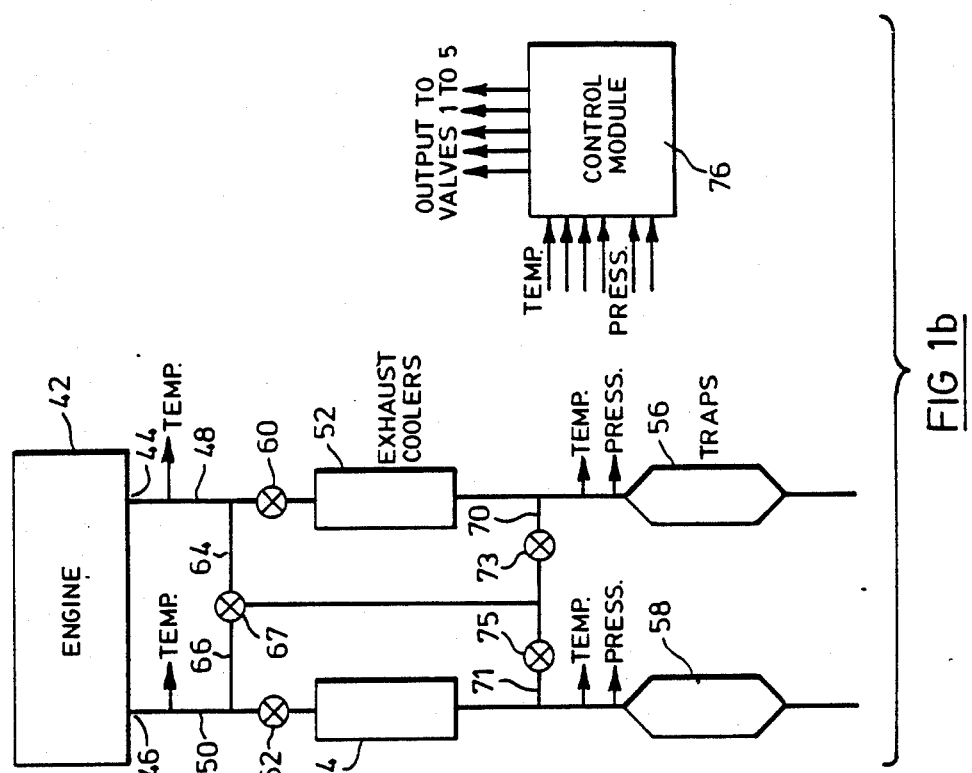
FIGS. 1a and 1b are two variants of an engine exhaust system showing the fifth approach provided herein.
Figure 1A:
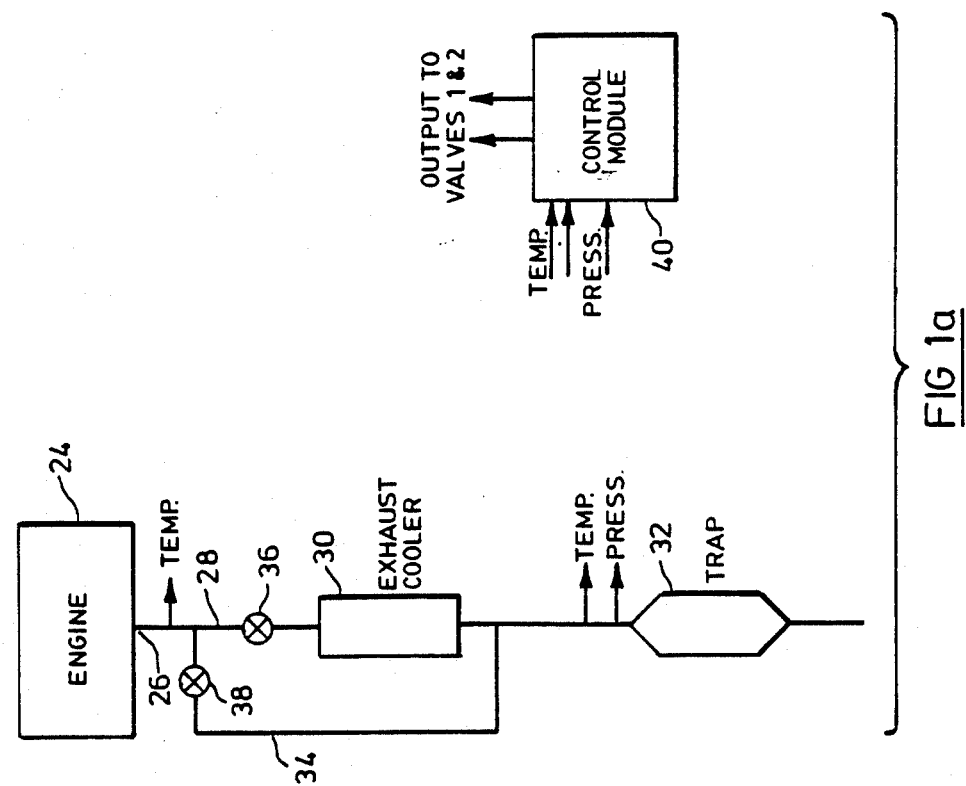

A further solution is shown in FIGS. 1a and 1b. The major change is to route the exhaust through exhaust cooler(s) instead of putting the trap at a remote location. The exhaust coolers provide the necessary cooling to condense the hydrocarbons within the exhaust gas. The condensed hydrocarbons, together with the particulate, will then fill the pores of the trap where the condensed hydrocarbon acts as a fuel to assist the ignition of the particulate.

A microprocessor-based control module is used to control the operation of the valves shown in FIGS. 1a and 1b. The valves are used to direct partial or complete exhaust flow through the traps bypassing the exhaust cooler(s). The hot exhaust gas going into the trap will then cause regeneration.

The control module uses exhaust backpressure in front of the trap, exhaust temperature and temperature inside the trap as input signals. It contains a pre-programmed regeneration strategy and will carry out the strategy by outputting control signals to the appropriate valves.

The set-up shown in FIG. 1a can be used for an inline diesel engine 24 with low exhaust flow. The engine 24 has a single exhaust port 26, to which an exhaust conduit 28 is connected. The exhaust conduit 28 ducts exhaust materials from the engine 24 firstly through an exhaust cooler 30, thence to a diesel particulate trap 32, thence to the atmosphere.

A by-pass conduit 34 is connected in parallel with the exhaust cooler 30 between a first location upstream of the cooler and a second location downstream of the cooler but upstream of the trap. A first valve 36 is located in the exhaust conduit 28 between the cooler 30 and the location where the by-pass conduit 34 connects to the exhaust conduit 28. A second valve 38 is located in the by-pass conduit 34.

A microprocessor-based control means 40 is adapted to carry out the steps of:

(a) allowing normal operation with the first valve 36 open and the second valve 38 closed, (b) then, when back pressure in the exhaust conduit reaches a predetermined level due to particulate build-up in the trap 32, gradually opening the second valve 38 and closing the first valve 36, thereby allowing exhaust materials to progressively by-pass the cooler 30, (c) then, when the trap 32 begins to regenerate thereby causing increased temperature in the trap, closing the second valve 38 and opening the first valve 36 to return the exhaust system to normal operation.

During this operation, the control module 40 monitors the exhaust back pressure and the exhaust temperature. The change-over of the valves takes place only if the exhaust temperature is above 250° C., and only when the back pressure reaches the predetermined level.

Upon completion of the regeneration of the trap 32, valve 38 would be completely closed, and valve 36 would be completely open.

The arrangement of FIG. 1b is ideally suited for a V configuration or a high exhaust flow diesel engine having two exhaust ports. The set-up is somewhat more complicated than the one shown in FIG. 1a, but the control strategy for the valves is the same. By opening and/or closing the appropriate valves, exhaust flow from both banks or both exhaust ports can be combined and directed into one trap, by-passing both coolers. This combined exhaust feed causes regeneration of the trap.

More particularly, FIG. 1b illustrates schematically an engine 42 having two exhaust ports 44 and 46. From these ports, exhaust conduits 48 and 50 are adapted to duct exhaust materials through first and second exhaust coolers 52 and 54 respectively, thence through first and second particulate traps 56 and 58 respectively, thence to the atmosphere. First and second valves 60 and 62 respectively are located upstream of the first and second coolers. First and second branch lines 64 and 66 join a third valve 67 to the first and second conduits 48 and 50, at locations upstream of the first and second valves 60 and 62.

A by-pass conduit 68 is connected at one end to the third valve 67 and communicates at the other end with third and fourth branch conduits 70 and 71 respectively, which connect with the first and second exhaust conduits 48 and 50 respectively, at locations between the cooler and the trap of the respective exhaust conduits.

Fourth and fifth valves 73 and 75 are located in the third and fourth branch conduits 70 and 71, respectively.

FIG. 1b also shows a microprocessor-based control module 76 which carries out the steps of:

(a) allowing normal operation with the first and second valves open, and the third, fourth and fifth valves closed, (b) when back pressure in one of the exhaust conduits rises to a predetermined level due to particulate build-up in its respective trap, gradually closing the first and second valves while gradually opening both the third valve and that one of the fourth and fifth valves which allows exhaust materials to be ducted to a location upstream of the trap which is causing the increased back pressure, (c) then, when the last-mentioned trap begins to regenerate, resulting in an increase in its internal temperature, returning the valves to their condition for normal operation as set out under (a).

The arrangement of FIGS. 1a and 1b would include sensors for the back pressure in the or each exhaust conduit, and the temperature in the or each trap. The cooler 30 is a gas/gas or gas/liquid heat exchanger interfacing with the atmosphere.

Testing

Testing of the arrangement just described was carried out in a test cell using a Deutz F8L 413 F/W engine. The set-up used was not identical to the ones shown in FIGS. 1a and 1b, but the principle was the same. Fuel additive was also used (80 mg Mn/L diesel). The results show that cooling of the exhaust did lower particulate ignition temperature (270° C.) and hot exhaust gas by-passing the exhaust cooler caused regeneration.

A further solution to the problem relates to a particulate control system which is especially suited to a General Motors, Detroit Diesel Allison 71 or 92 series, naturally-aspirated or turbocharged engine. The Detroit diesel engine operates on a 2-stroke principle where the intake, compression, power and exhaust cycle of the engine occurs in 2 strokes of the piston. This process, commonly referred to as "scavenging", is necessary to allow the engine to provide a sufficient charge of fresh air for combustion as well as to force residual spent gases out of the cylinders. The scavenging process is accomplished by the use of a blower system which controls the scavenging ratio of the engine. This ratio may be defined as the ratio of the mass of fresh air delivered through the engine to the ideal mass of air that actually fills the cylinder at the air box density. The 2-stroke engine design lends itself to allowing a flexible control of the air charge conditions (air/fuel ratio) within the cylinders.

Figure 2:
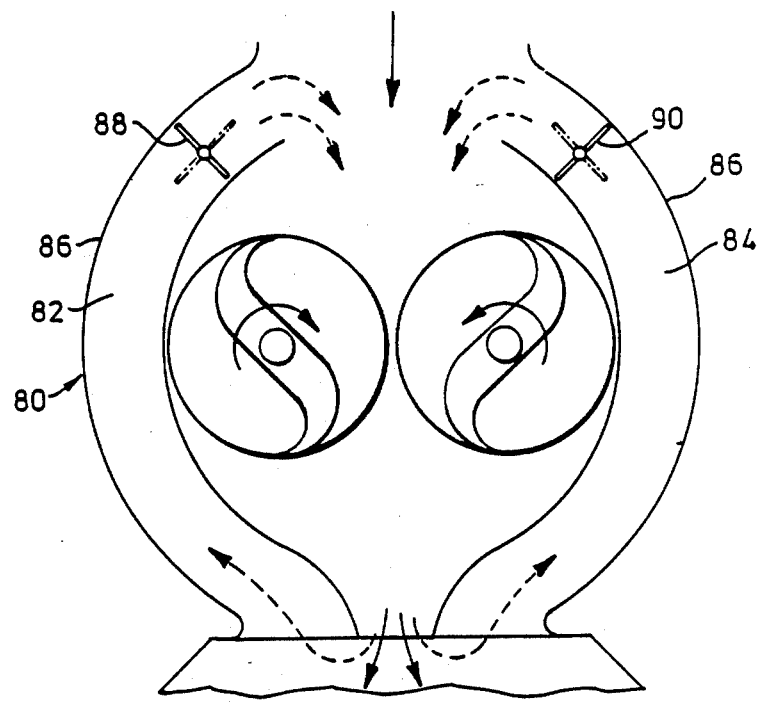
FIG. 2 is a somewhat schematic, vertical sectional view of a maxi-bypass blower for use with the second and third approaches provided herein.

A prototype blower design referred to as a maxi-bypass blower which can be mounted on either a 71 or 92 series engine was designed and tested by General Motors for an alternative fuel study carried out on a 6V-92TA engine (SAE Paper No. 831744). The maxi-bypass blower is shown in FIG. 2 at 80. The blower maintains the same displacement of 327 cubic inches as the conventional model, and incorporates two bypass passages 82 and 84 cast along the outer main walls 86 of the blower 80. A recirculation loop of the scavenging air supply is used to control air box pressure by simply varying the opening of two butterfly valves 88 and 90 located between the outlet and inlet sides of the blower. The bypass blower 80 operates as a conventional blower when the butterfly valves 88 and 90 are closed. The purpose of this facet of the invention is to show how this unique blower design, coupled with a supplemental fuel mixture injection into the exhaust, can be used to promote and assist the regeneration of diesel particulate filters. This approach can be used with fuel additives in the engine fuel supply.

Figure 3:
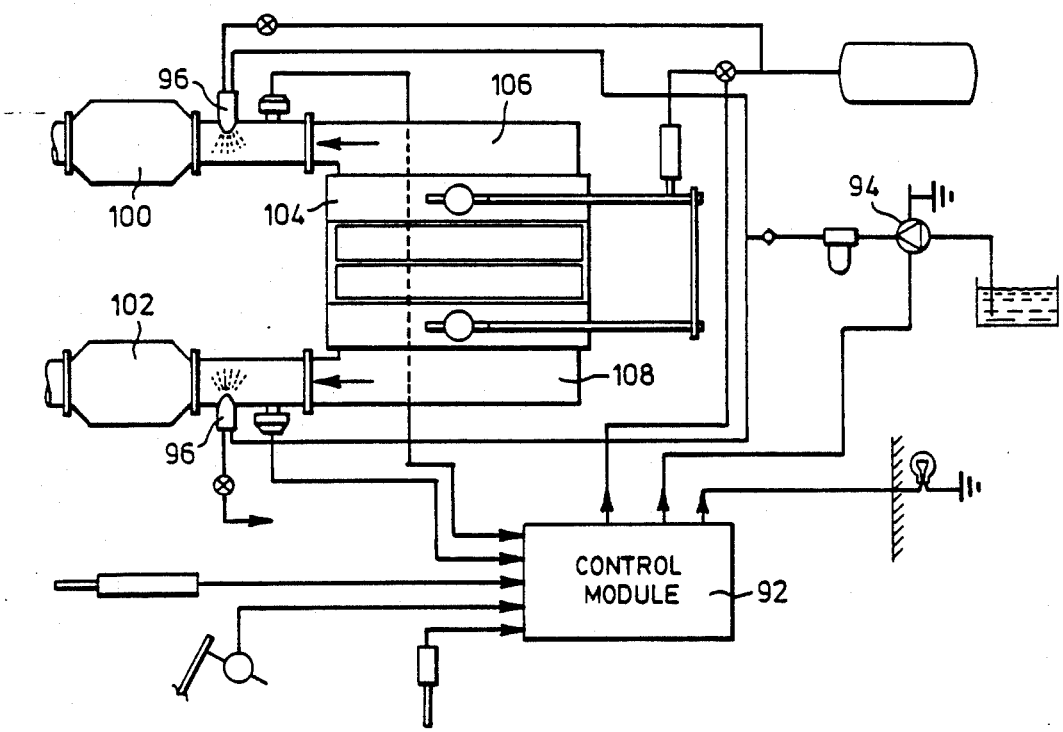
FIG. 3 is a schematic drawing of the particulate regeneration control system for the second approach.

The system provided herein regenerates the build-up of trapped particulate in the trap by combining the operation of two separate systems which share a common control module. A schematic of the particulate regeneration system is shown in FIG. 3.

The combination of blower bypass operation and the introduction of a supplemental fuel mixture containing a fuel additive into the exhaust gas stream is expected to result in a synergistic effect in reducing exhaust gas temperatures to achieve regeneration of the filters.

The bypass blower is operated initially to raise the exhaust gas temperatures when the engine is operated at a medium load speed condition. This is followed shortly thereafter by the controlled introduction of a finely atomized fuel mixture which utilizes the higher exhaust gas temperatures to ignite more easily. Regeneration of the particulate may occur in a shorter period of time, thereby reducing the overall required operating time of the blower bypass and supplemental fuel system if each were operated on an individual basis. Both systems, which share the same input parameters, are described below.

Maxi-Bypass Blower

The butterfly valves 88 and 90 of the maxi-bypass blower 80 are opened by actuators to a predetermined number of degrees when an output signal is received from a common control module 92. The bypassing of a portion of the scavenging air reduces the trapped air/fuel ratio resulting in a higher cylinder and exhaust gas temperature.

Supplemental Fuel Supply

A supplemental fuel pump 94 is operated upon receiving a signal from the common control module 92. The combustible mixture enters air atomizing nozzles 96 under pressure where the fuel droplets are finely atomized by the use of compressed air before being sprayed into the exhaust gas streams ahead of the inlets of the traps 100, 102. The finely atomized fuel provides for a more complete burning of the fuel mixture entering the exhaust stream. The compressed air also provides oxygen to promote burning within the exhaust gas stream.

The control module 92 receives the following inputs from the engine 104:

1. Exhaust Backpressure Sensor

One pressure switch is located in each exhaust bank 106, 108 of the engine 104 located between the exhaust manifold and the trap inlet. If either exhaust bank reaches a predetermined pressure setting, an input signal is received by the control module 92.

2. Fuel Rack Position Sensor

This is used as an indicator of engine load to ensure that the bypass passages within the blower are fully closed, and that the supplemental fuel pump is not operated while the engine is operating at idle, low load or full load condition.

3. Throttle Position Sensor

A position sensor is mounted on the throttle of the engine to measure the rate of movement of the throttle. A circuit within the control module is set up to respond to a rapid acceleration by ensuring that blower bypass is not taking place when the drive demands high power immediately. This circuit is able to differentiate between a rapid acceleration and a slow movement of the throttle.

4. Optional—Temperature Sensor—Mounted in the Traps

This would act as a protection device for the traps 100, 102 to prevent further blower bypass or supplemental fuel introduction should a runaway exotherm take place within the traps. This signal could provide an output signal to an LED located in the dash of the vehicle to alert the operator of a potential problem (i.e. a stuck actuator providing a continuous bypass).

When all input parameters are attained, the control module 92 transmits a signal to the bypass valve actuator. The bypass valve actuator is allowed to open the blower bypass butterflies 88 and 90 a specified number of degrees. The supplemental fuel pump 44 is operated following a predetermined time delay after the blower bypass has been initiated. This technique allows enough time for exhaust gas temperatures to rise and promote the burning of the fuel mixture in the exhaust gas stream. A second timer within the control module allows the fuel system to operate for a short period of time after which point the system is shut off. The pump may be allowed to cycle if exhaust backpressure is not reduced to an acceptable level. When regeneration occurs within the traps 100, 102, the blower bypass butterflies 88, 90 are closed and the supplemental fuel pump 94 is no longer energized until such a point where all input parameters are met again.

If a problem exists whereby regeneration does not occur after a specified period of time, the LED located on the dashboard of the vehicle will alert the operator that the exhaust backpressure is too high.

Testing

Testing of the individual particulate control system described immediately above was carried out on a Detroit Diesel Allison 6V-71N (naturally operated) engine in early 1985. The conventional blower was removed and replaced with a prototype bypass blower. Minor component changes were necessary to adapt the maxi-bypass blower to the 71 series engine, since it was originally designed for a 92 series engine. These changes included a new rear timing gear cover and blower drive shaft. A manual control and location indicator was fabricated in order to achieve repeatable blower bypass positions during steady-state testing.

The stock engine, incorporating a horizontal oil pan for ease of set-up, was installed in a test cell at Ontario Research Foundation. A GOPOWER DT1000 water break dynamometer was used to generate a load on the engine. Two Corning diesel particulate filters (traps) were installed in each exhaust bank of the engine with a section of exhaust pipe approximately 2' (feet) long separating the filters from the exhaust manifolds of the engine. Differential pressure across the filter was measured using a water manometer. A mercury manometer was used to measure air box pressure. Two type K thermocouples ($T_3$ and $T_4$) were installed into the left filter (as viewed from the rear of the engine). The thermocouples were connected into an analogue voltage converter which was plugged into a chart recorder to record real-time temperature variations during the testing.

The diesel fuel used to operate the engine during the development of both bypass and fuel spray systems was premixed with a high concentration of manganese (Mn): 100 mg Mn/L of diesel 40 fuel oil. When a specified differential pressure was reached across either filter, the engine load was increased to raise the exhaust gas temperature to a point below the anticipated regeneration temperature. Once the engine conditions stabilized at a 50% load/speed, the blower bypass valve was opened to a point where regeneration temperature was achieved.

Engine set-up remained the same during the testing of the supplemental fuel system. The Tuthill magnetic drive fuel pump capable of 100 psi was used to spray a variety of different fuels containing various percentages of fuel additives into the exhaust. An air atomizing nozzle assembly was mounted into the exhaust pipe before the inlet of the filter on the left exhaust bank as viewed from the rear of the engine. The engine was operated at a medium load speed condition in order to build-up the filter walls with particulate. When a specified differential pressure was reached across either filter, the engine load was increased to raise the exhaust gas temperatures to an equilibrium point; a point where the filters were no longer building up particulate. A steady flow of fuel mixture was introduced by manual operation of a voltage supply into the exhaust gas stream for a brief moment. After the fuel to the atomizing nozzle was shut off, the exhaust temperature at the outlet of the left filter increased rapidly. Regeneration of the particulate occurred resulting in a reduction of differential pressure drop across the left filter.

In regard to the third aspect of this development, it has been found that the temperature required to cause regeneration within a filter trap is in the area of 420° C. while the engine is being operated on diesel fuel combined with a small percentage of fuel additive (Manganese at from 80 to 100 mg Mn/L) in diesel fuel. The required regeneration temperature when the engine is operated on neat diesel fuel is approximately 450° C. or greater. As pointed out above, the regeneration of the particulate build-up in the filter must occur at a lower temperature in order to allow for a more remote mounting location of the filter, as well as a reduction of the need for the engine to work under full load conditions in order to satisfy the regeneration requirement.

The present facet of this development aids the regeneration of the build-up of particulate matter in a filter trap by introducing a combustible fuel mixture combined with air into the exhaust gas stream prior to entering the inlet side of the filter. The small quantity of fuel with the fuel additive ignites in a controlled manner thus raising the exhaust gas temperature to a point where regeneration will occur. This reduces the need for the engine to have to operate under a full load condition, and also provides for a more practical mounting location of the filter.

Figure 4:
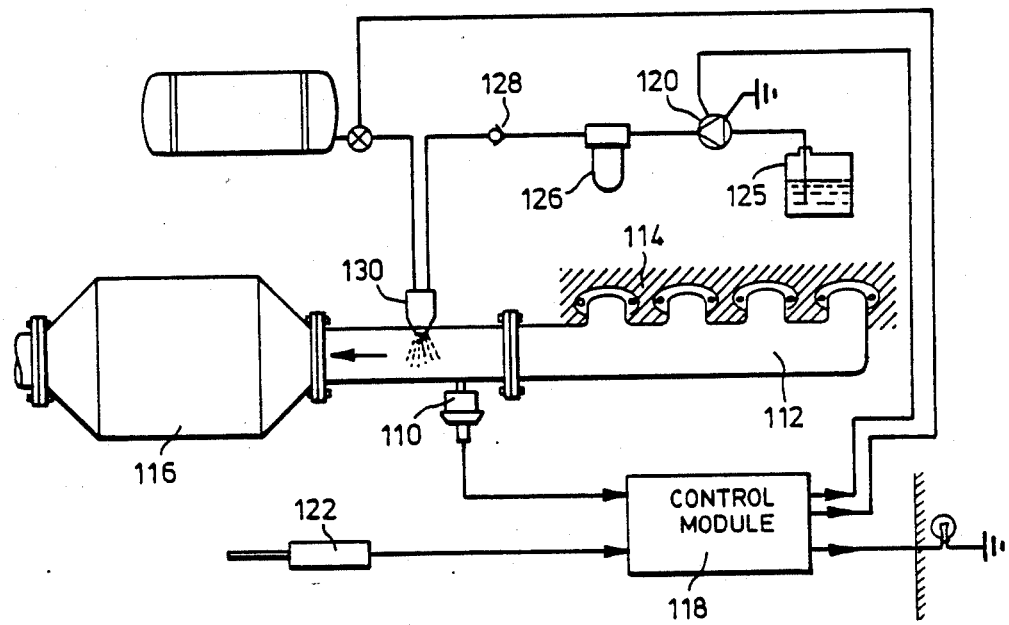
FIG. 4 is a schematic drawing of a particulate regeneration control system for the third approach.

A schematic of the particulate regeneration system is shown in FIG. 4. An exhaust backpressure switche 110, located in each exhaust bank 112 of a V style engine 114, is situated between each exhaust manifold of the engine and the inlet of each filter 116. The switches 110 are constantly monitoring backpressure acting on the engine 114. As the filters 116 build up with particulate to a maximum predetermined point, either switch provides an input signal to a control module 118 which then provides an output signal to the system's fuel pump 120 to operate. A second input into the control module comes from a fuel rack position sensor 122 which is used as an indication of the engine load. This second input prevents the supplemental fuel system from functioning if the engine is operating at a very light load or at idle when exhaust temperatures are not high enough to ignite a combustible mixture in the exhaust system. A timer within the control module allows the fuel system to operate for a very short period of time (approximately 30 seconds) at which point the fuel system is shut off. If regeneration does not occur at this point and the exhaust backpressure switch still indicates a high backpressure, the control module 118 will restart the pump following a delay of approximately 5 minutes. The system will continue to cycle the pump 120 until regeneration of the particulate build-up has taken place as indicated by the drop in exhaust backpressure.

The fuel pump draws fuel mixture from a small tank 125 mounted on the vehicle. The fuel mixture flows through a filter 126 and a one-way check valve 128 before entering air atomizing nozzles 130 mounted in the exhaust banks near the inlet of the filters (only one nozzle 130 seen in FIG. 4). The air atomizing nozzle 130 mixes compressed air with the fuel mixture to form a finely atomized spray. The compressed air, which is taken from the vehicle's compressed air system, serves two purposes. First, it mixes with the fuel mixture inside the nozzle 130 causing the fuel mixture droplets to break apart into a very fine mist. This in turn will provide for a more complete burning of the fuel mixture entering the exhaust system. The air's second purpose is to provide oxygen to promote burning within the exhaust.

If a problem exists whereby regeneration does not occur after a specified period of time, an LED located on the dashboard of the vehicle will signal the operator of the vehicle that the exhaust backpressure is too high.

Testing

Figure 5:
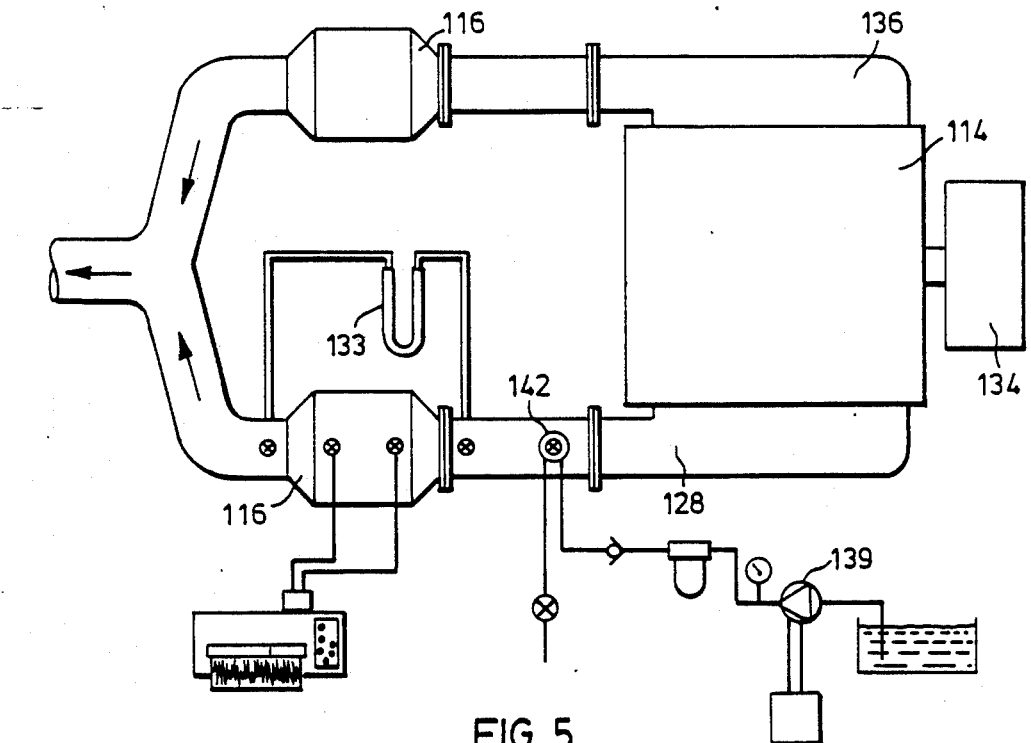
FIG. 5 is a schematic drawing of the test arrangement for a diesel engine, utilizing the system of the third approach.

Testing of the system in its simplest form was carried out on a 6V-71 naturally aspirated Detroit Diesel Engine found in some intercity bus applications. The stock engine, incorporating a horizontal oil pan for ease of set up, was installed in a test cell at Ontario Research Foundation (refer to FIG. 5). A GOPOWER DT1000 water brake dynamometer 134 was used to create a load on the engine. Two Corning diesel particulate filters 116 were installed one in each exhaust bank 136, 138 of the engine with a section of exhaust pipe approximately 2' (feet) long separating the filters from the exhaust manifolds of the engine. Differential pressure across each filter was measured using water manometers 133. A mercury manometer (not shown) was used to measure air box pressure. Two Type K thermocouples ($T_3$ and $T_4$) were installed into the left filter (as viewed from rear of engine) and situated as shown in FIG. 5. The thermocouples were connected into an analogue voltage converter which was plugged into a chart recorder to record real time-temperature variations during the testing. A Tuthill magnetic drive pump 139 capable of 100 psi was used to spray a variety of different fuels containing various percentages of fuel additives, into the exhaust. An air atomizing nozzle assembly 142 was mounted into the exhaust pipe before the inlet of the filter on the left exhaust bank as viewed from the rear of the engine.

The engine was operated at a medium load speed condition, typically 1900 RPM, 260 lbs. ft. in order to build up the filter walls with particulate. The diesel fuel used to operate the engine was premixed with a high concentration of manganese (Mn), 100 mg Mn/L of diesel 40/fuel oil. When a specified differential pressure was reached across either filter, the engine load was increased to raise the exhaust gas temperatures to an equilibrium point; a point where the filters were no longer building up particulate but regeneration had just started. It is at this point that differential pressure across the inlet and outlet of the DPF remained relatively steady.

Once equilibrium was obtained in the left filter a steady flow of diesel fuel combined with a high percentage of Mn/Cu fuel additives was introduced by manual operation of a voltage supply into the exhaust for approximately 30 seconds. After the fuel to the atomizing nozzle was shut off, the exhaust temperature at the outlet to the left filter increased rapidly from 390° C. to 500° C. Regeneration of the particulate occurred resulting in a reduction of differential pressure drop across the left filter. The filter was found to regenerate at this point.

The fourth approach to the problem recognizes that small quantities of fuel additives combined with diesel fuel are not fully satisfactory in terms of reducing the regeneration temperature enough to reduce the engine exhaust backpressure.

This facet relates to a particulate control system adaptable to a General Motors, Detroit Diesel Allison 71 or 92 series naturally-aspirated or turbocharged engine. The Detroit Diesel engine operates on a 2-stroke principle, as described earlier. "Scavenging" is necessary to allow the engine to provide a sufficient charge of fresh air for combustion as well as to force out of the cylinders any residual spent gases. The scavenging is accomplished by the use of a blower system which controls the scavenging ratio of the engine. As pointed out earlier, this ratio may be defined as the ratio of the mass of fresh air delivered through the engine to the ideal mass of air that actually fills the cylinder at the air box density.

The bypass blower shown in FIG. 2 again plays a significant role in the present inventive aspect. This aspect is such as to avoid the necessity for an engine to operate at full load condition in order to meet the regeneration temperature needs of the filters. The particulate control system herein may be applied to 2-stroke naturally-aspirated or turbocharged diesel engines.

The bypass blower shown in FIG. 2 provides a reduced scavenging ratio and a lower trapped air fuel ratio, resulting in high cylinder and exhaust gas temperatures.

Figure 6:
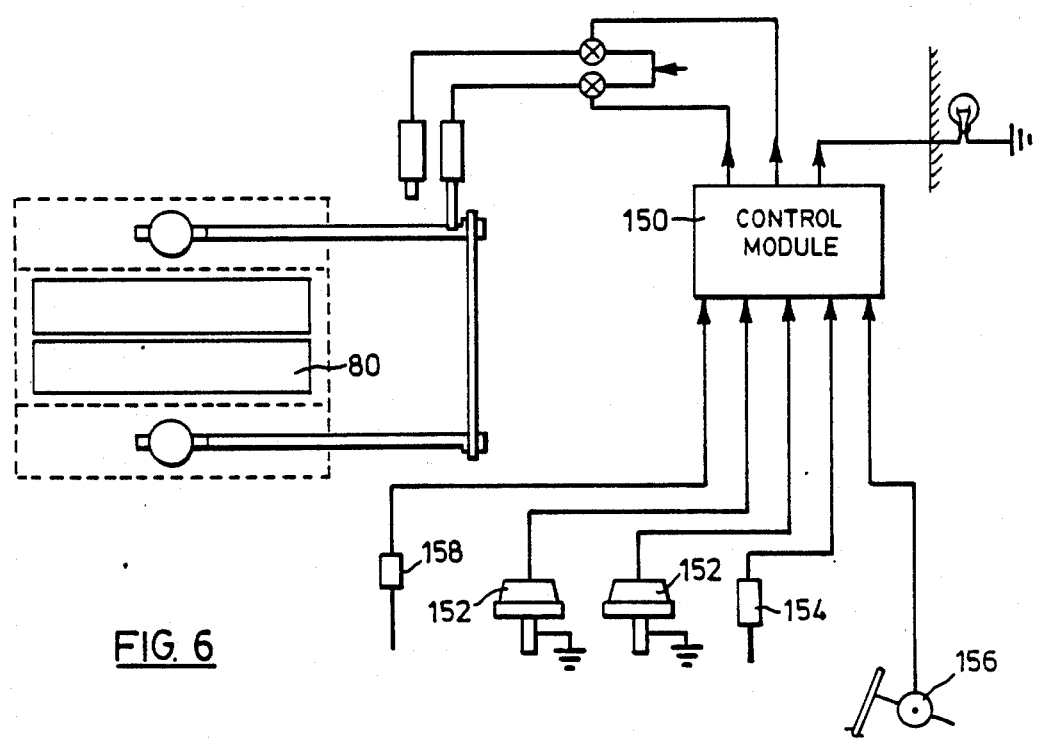
FIG. 6 is a schematic view of a particulate control system in accordance with the fourth approach provided herein.

This particulate control system, seen in FIG. 6, utilizes a maxi-bypass blower 80 and achieves regeneration of trapped insoluble particulate by increasing exhaust gas temperature at medium load speed conditions. The butterfly valves 88 and 90 are opened by actuators to a predetermined number of degrees when an output signal from a control module is received.

The electronic control module 150, for this inventive aspect, receives the following inputs from the engine:

1. Exhaust Backpressure

One pressure switch 152 is located in each exhaust bank of the engine between the exhaust manifold and the filter inlet. If either exhaust bank reaches a predetermined setting, an input signal is received by the control module.

2. Fuel Rack Position Sensor 154

This is used as an indication of engine load to ensure the bypass passages within the blower are fully closed during idle, light load or full load conditions.

3. Throttle Position Sensor 156

A position sensor is mounted on the throttle of the engine to measure the rate of movement of the throttle. A control circuit within the control module is set up to respond to a rapid acceleration by ensuring that blower bypass is not taking place when the driver demands high power immediately. The circuit will be able to differentiate between a rapid acceleration and a slow movement of the throttle.

4. Optional—Temperature Sensor 158

This is mounted one in each filter. The sensors would be used as a protection device for the filters to prevent further blower bypass should a runaway exotherm take place within the filters. This signal could provide an output signal to an LED located in the dash of the vehicle to alert the operator of a potential problem, i.e. stuck solenoid valve providing a constant bypass.

These various inputs are also the basic inputs for the second aspect of this invention described earlier.

When input parameters are achieved, the control module transmits a signal to the bypass valve actuator. The bypass valve actuator is allowed to open the blower bypass butterfly a set number of degrees. If regeneration does not take place with 15 minutes as determined with the application of a timer, a second signal is applied to the actuator which opens the blower bypass butterflies 88, 90 further.

It will be appreciated that, generally, the fourth aspect of this invention is similar to the second aspect, but without the provision of a supplemental fuel supply.

Testing

Testing of the fourth aspect of this diesel particulate control system incorporating the maxi-bypass blower was carried out on a Detroit Diesel Allison 6V-71N (naturally aspirated) engine in January of 1985. The conventional blower was removed and replaced with a prototype bypass blower. Minor component changes were necessary to adapt the maxi-bypass blower to the 71 series engine since it was originally designed for the turbocharged 92 series engine. These changes included a new rear timing gear cover and blower drive shaft. A manual control and location indicator was fabricated in order to achieve repeatable blower bypass positions during steady state testing.

The engine was fully instrumented with type K thermocouples and pressure taps.

Water manometers were connected before and after each filter to measure differential pressure. A mercury manometer was used to measure air box pressure. Two Type K thermocouples located at the inlet and outlet of the filter were connected into an analogue voltage converter which was plugged into a chart recorder to record real-time temperature variations during the testing.

The engine utilized diesel 40 fuel with a high level of additive (100 mg Mn/L). Base exhaust temperatures and pressures were collected over a load/speed matrix with the bypass closed and the blower butterfly location indicator reading "0".

The bypass butterfly valves were then opened to the indicator readings of "4" and "6" with the base test matrix repeated for each setting. For the indicator setting of "4" the temperature range increased 24° C. to 51° C. from the base temperatures. Temperatures increased 47° C. to 166° C. from the base temperatures with the indicator reading "6".

Temperature range covered from the lowest base temperature of 320° C. to a maximum temperature of 506° C. at 1800 RPM/75% load with the indicator reading "6".

With the maxi-bypass blower engaged, the regeneration temperature of 420° C. was achieved and exceeded for all 75% load/speeds tested with an indicator setting of "4" and one 50% load/speed with an indicator setting of "6". Regeneration was observed at these settings by observing decreasing pressure levels.

While several aspects of this invention have been illustrated in the accompanying drawings, and described hereinabove, it will be evident to those skilled in the art that changes and modifications may be made therein, without departing from the essence of this invention.

The embodiments of the invention in which an exclusive property or privilege is claimed are defined as follows:

1. For use with a diesel engine having a first and a second exhaust bank, a particulate trap system comprising:
   a first particulate trap in heat-exchange relation with the exhaust materials passing through the first exhaust bank, at a location substantially immediately downstream of the first exhaust bank,
   a second particulate trap in heat-exchange relation with the exhaust materials passing through the second exhaust bank, at a location substantially immediately downstream of the second exhaust bank,
   each trap having an inlet and an outlet,
   a first exhaust pipe from the first exhaust bank to the inlet of the second particulate trap, a second exhaust pipe from the second exhaust bank to the inlet of the first particulate trap, each exhaust pipe being of sufficient length to allow some condensation of hydrocarbons in the exhaust materials due to cooling thereof,
   and exhaust conduit means ducting exhaust materials from the outlet of each trap to the atmosphere.

2. The invention claimed in claim 1, in which each exhaust pipe is at least about 6 meters in length.

* * * * *